E. F. JONES.
Lamp.
No. 648. Reissued Jan'y 11, 1859.
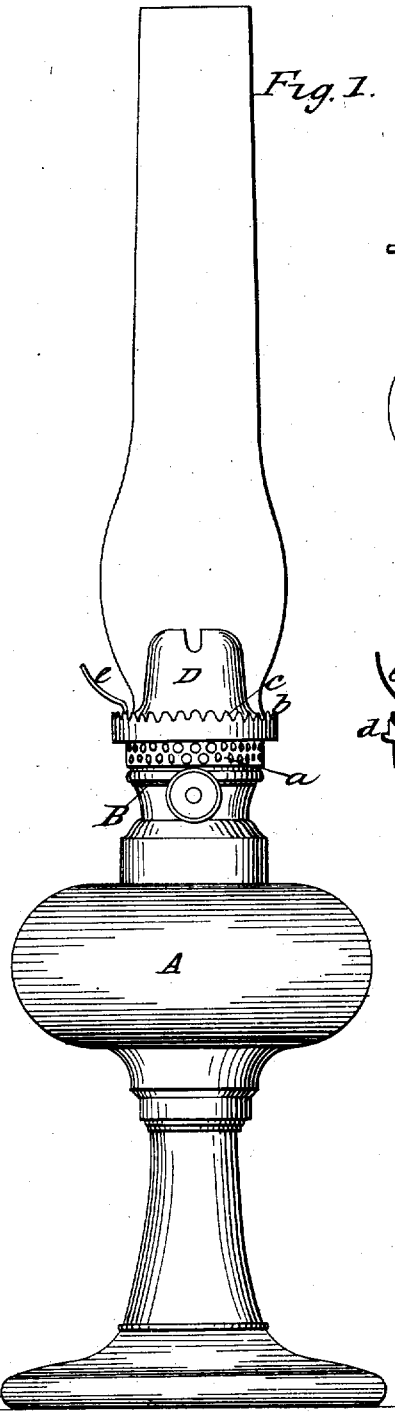
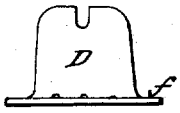
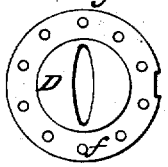
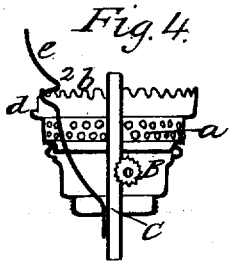
Witnesses:
Thos. A. Roach
Thos. Glover
Inventor:
Edward F. Jones
N. PETERS, Photo-Lithographer, Washington, D. C.

UNITED STATES PATENT OFFICE.

EDWARD F. JONES, OF BOSTON, MASSACHUSETTS.

IMPROVEMENT IN LAMPS.

Specification forming part of Letters Patent No. 20,159, dated May 4, 1858; Reissue No. 648, dated January 11, 1859.

*To all whom it may concern:*

Be it konwn that I, EDWARD F. JONES, of Boston, in the county of Suffolk and State of Massachusetts, have invented certain new and useful Improvements in Lamps, of which the following is a full, clear, and exact description, reference being had to the accompanying drawings, making part of this specification, in which—

Figure 1 is an elevation of a lamp with my improvements attached; Fig. 2 is an elevation of the deflector detached; Fig. 3, a plan of the same; Fig. 4, a vertical section through the cap.

I am aware that deflectors such as are shown in Figs. 2 and 3 have been used, but they have either been permanently attached to the cap of the lamp or hinged thereto, which rendered it inconvenient to clean them, as they could not be detached from the lamp for the purpose.

I am also aware that deflectors for solar lamps have been made detachable from the lamp, but such deflectors have been attached to the chimney, and with it were secured to the lamp.

My invention consists in the use of a deflector which is detached from the lamp, in combination with a chimney when the chimney is secured to the cap independently of the deflector.

My invention also consists in holding the deflector, as well as the chimney, to the cap of the lamp by means of a spring, so that the chimney and deflector, or either of them, may be readily removed by merely pressing back a spring.

That others skilled in the art may understand and use my invention, I will proceed to describe the manner in which I have carried out the same.

In the drawings, A is the lamp, to which is attached the cap B, (in section, Fig. 4.) This cap is perforated with holes *a*, to admit air to the flame, and is scalloped around the top or rim at *b*. Two or more of these scallops on one side of the cap are bent over, as at *c*, and on the opposite side the rim is cut away for the space of two or three scallops at *d*, to permit the play of a spring, *e*, the lower end of which is secured to the wick-tube C. This spring is formed, as shown in Fig. 4, of thin metal having short bends at 1 and 2 to catch over the lip or base of the chimney or shade; or it may be formed with a projection cast at this point; but I do not confine myself to the particular form of this spring. The deflector D is placed upon the cap, one side of its lip *f* being placed beneath the bent scallops *c* and the other side pressed down past the bend Q of the spring *e*. The chimney is then put on in the same manner, and the spring *e* holds it and the deflector securely. A deflector thus applied may be easily detached from the lamp for the purpose of cleaning it or otherwise, while the chimney may also be detached independently of the deflector.

What I claim as my invention, and desire to secure by Letters Patent, is—

1. Securing the chimney to the removable deflector, and both of them to the lamp cap, by means of a spring operating in the manner substantially as set forth.

2. A detached deflector, in combination with a chimney when the chimney is secured to the cap independently of the deflector, as set forth.

EDWARD F. JONES.

Witnesses:
THOS. R. ROACH,
THOS. L. GLOVER.